March 9, 1943. A. K. CROSS 2,313,518
VISION TRAINING DRAWING TABLET
Filed June 23, 1941
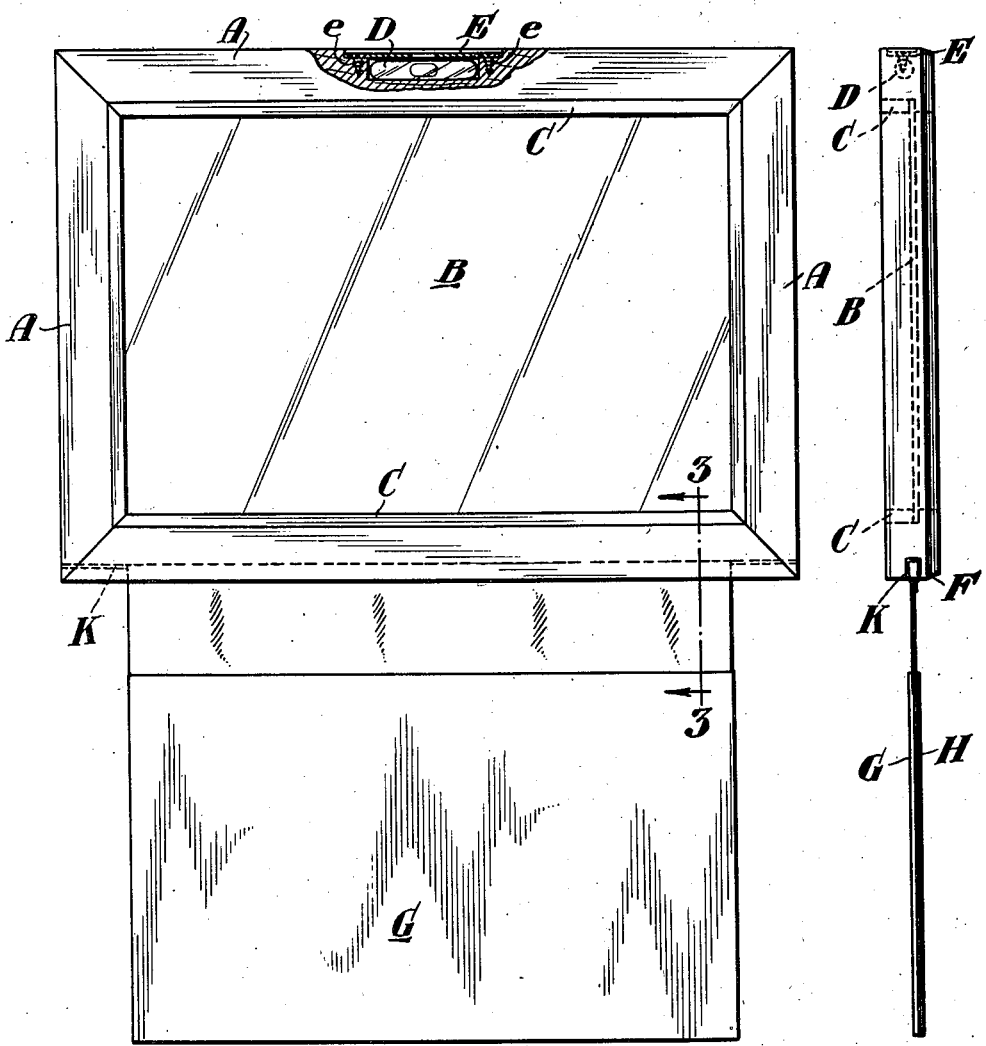
Fig. 1.
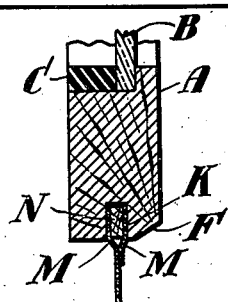
Fig. 3.
Fig. 2.
Inventor:
Anson K. Cross Patented Mar. 9, 1943

2,313,518

UNITED STATES PATENT OFFICE 2,313,518

VISION TRAINING DRAWING TABLET

Anson Kent Cross, Boothbay Harbor, Maine

Application June 23, 1941, Serial No. 399,408

3 Claims. (Cl. 35—26)

The purpose of this invention dates back to my first patent for a process of making and correcting freehand drawings. This patent was issued on February 7, 1893, Number 491,160. Several later patents on construction have been issued to be but until now I have not found a way to make the drawing tablet so cheaply that it can be used generally in the public schools.

This application shows a sheet of transparent material to receive the drawing, a frame to protect the transparent sheet and an opaque sheet to be placed behind the transparent sheet all as described in said earlier patents but combined with new features which make the drawing tablet cheaper to make and easier to use.

My inventions are not intended as aids for the making of pictures but as means to develop a vision so true that my inventions together with all customary measures, tests and theories may be discarded and students work by vision and feeling to produce artistic results instead of the inaccurate and mechanical results due to use of the mechanical aids generally depended on.

Study of scientific perspective never gives true vision, for the vertical picture plane of this science distorts all objects not directly opposite the eye. The true appearance of any object must therefore be determined on a surface that is at right angles to the direction in which the object is seen.

The normal eye is a camera which records the appearances that artists strive to record. To do this, they have used glass for hundreds of years to make tracings of objects seen behind the glass that they might transfer these tracings to paper or canvas.

These tracings are similar to the image on the retina when the glass is at right angles to the direction in which the object is seen, but the student who traces appearances seldom learns to draw correctly by eye and without the aid of measures, tests, theories or some mechanical aid.

The lines of a true drawing made on the glass will appear to cover the lines of the object when the glass is at right angles to a line from the eye to the object. Therefore, the student who wishes true vision should draw by eye alone on the drawing tablet when an opaque screen is behind the glass so the drawing appears as if made on the opaque screen. He should not measure or test or apply theory before drawing or while drawing and he should make all corrections possible for him to make by eye alone, before he drops the opaque screen from its position behind the transparent screen where it should be all the time the drawing is being made. The student learns only by making mistakes then discovering and correcting them. A correct drawing will appear to cover the object when it is held at the proper distance from the eye, between the eye and the object with the surface of the glass at right angles to the direction in which the student sees the object and with the upper and lower sides of the drawing table horizontal.

When the table is held at such a distance from the eye that one or more lines of the drawing appear to cover the corresponding lines of the object, any failure of the other lines of the drawing to cover the corresponding lines of the object is instantly seen. Thus the student discovers his mistakes and corrects them without the help of an instructor.

Continued use of the tablet in this way soon produces such perfect vision for perspective effects that there is no longer need for making drawings on the glass as the student will draw equally well on paper or canvas. He will do this without the aid of the pencil measures of proportions and angles which artists rely on in spite of the fact that these tests never give accurate results or a truth of vision that needs no mechanical aids.

Noted artists who use this drawing tablet after even 40 years of study find that they do not see angles and proportions truly. They often represent retreating horizontal lines below the eye by lines that descend and cannot see this mistake until use of the spirit level enables them to see that the lines appear to incline upward.

By usual methods both students and artists measure proportions and angles with a pencil or ruler which they fail to hold at right angles to the direction in which the object is seen when they measure proportions and which they fail to hold horizontal when they study the angles that lines appear to have. These failures are so serious that students never gain accurate results or truthful vision.

To produce true drawings, the surface of the tablet must be held at right angles to the line in which an object is seen and its upper and lower edges must be exactly horizontal. To insure the horizontal position, a spirit level must be used and to avoid holding the surface of the drawing table oblique to the visual rays, the edges of the frame should be beveled so that the two opposite edges will appear of equal width when the surface of the glass is at right angles to the central visual ray.

I have placed these beveled edges on one side of the frame to save expense in making the frame, but they can be placed on both sides of the frame if desired. Their use for a short time even when they are on only one side of the frame trains the student to see the correct unforeshortened position of the glass without reference to the beveled edges. This is another and educational reason for omitting the bevel on one side of the frame.

The new feature is the use of an opaque tablet whose surfaces are of different colors, one a very light color to be placed behind the glass when a dark china-marking crayon is used to make the drawing and the other surface being a very dark color to be placed behind the glass when a light colored crayon is used to make the drawing. Sometimes the lines of the drawing are seen most readily when a dark crayon is used with the light side of the opaque tablet behind the glass and sometimes the drawing is best seen when a crayon of light color is used when the dark side of the opaque sheet is behind the glass.

This improvement of an opaque screen of two colors may be applied by adapting the opaque screen to slide in grooves in the frame A.

In my Patent No. 508,468, November 14, 1893, I have shown a curtain, adapted to cover and uncover the sheet of glass so that the lines of a drawing on the glass may be readily seen against the curtain or when covering the lines of the object.

In my Patent 1,282,382, October 22, 1918, I have shown on opaque sheet that slides in grooves in the frame behind the glass.

In my Patent 1,041,435, October 15, 1912, I have shown an opaque screen hinged to the frame of the tablet.

All of these opaque screens are white and cover one side only of the transparent sheet.

I attain these objects by the mechanism shown in the accompanying drawing in which Figure 1 is a view of the back of the drawing tablet, showing the opaque screen hanging vertically below the drawing tablet with its white surface visible.

Figure 2 is a view from the right side.

Figure 3 is an enlarged section of the lower side of the frame A showing the rubber strip C which holds the glass in the frame. This figure also shows the way in which the cloth hinge M for the opaque screen is held in a saw-out K in the lower side of the frame A.

The frame A may be of wood or any other material. The transparent screen B on which the student draws may be common window glass or any material through which objects may be clearly seen. It is held in the frame A by two or four strips C which are secured to the frame by cement or brads. I prefer to make these holding strips C of rubber that the transparent screen when of glass may be less likely to break in the mails or when in use.

A spirit level D is inserted in the upper edge of the frame A to show when this side is horizontal. It is protected by a covering plate E fastened to the frame by brads e.

The four outer edges of the frame A are bevelled, preferably after the frame has been stained or painted, so that the bevelled edges F will be easily seen when the student looks through the transparent screen to see if the lines of the drawing appear to cover those of the object when the transparent screen or glass is at right angles to a line from the eye to the object. In this correct position the two opposite bevelled edges F will appear of equal width and thus they serve as sights to determine the correct position of the drawing tablet when correcting the drawing, and also when making the drawing.

I prefer to make the opaque screen of two cards, one G to show a white or light colored surface when seen through the glass and the other H to show a black or dark colored surface when seen through the glass.

The hinge M of cloth is cemented in a saw-cut K made in the center of the lower side of the frame A. To make this cloth fill the cut I place a thin strip of wood n in the center of the cloth, then fold the cloth over it and cement the two parts of the cloth together and then cement the cloth inside the frame and within the two cards G and H that form the opaque screen.

Having described my invention, what I claim is:

1. In a drawing tablet for self instruction in drawing a sheet of transparent material adapted to receive a drawing and a sheet of opaque material adapted to lie over either side of the transparent sheet and having one of its two surfaces of any light color and the other surface of any dark color, either of which colors may be placed in contact with the transparent sheet to make the lines of the drawing on the transparent sheet easy to see against either the dark side or the light side of the opaque sheet.

2. In a drawing tablet for self instruction in drawing, a sheet of transparent material to receive the drawing, a sheet of opaque material having one surface of any light color and the other surface of any dark color and adapted to lie over either side of the transparent sheet to make the drawing upon it easy to see and a spirit level to show when the sides of the transparent sheet are horizontal.

3. In a drawing tablet for self instruction in drawing a sheet of transparent material to receive the drawing, a frame to hold and protect this sheet, a spirit level to indicate when the frame is horizontal and a sheet of opaque material, one side being of any very light color, the other side being of any very dark color, secured at an edge of the transparent sheet or its protecting frame and adapted to lie over either side of the transparent sheet so that the drawing upon the transparent sheet may be seen against either the light side or the dark side of the opaque sheet.

ANSON KENT CROSS.